(12) United States Patent
Laughlin, Jr.

(10) Patent No.: US 6,276,503 B1
(45) Date of Patent: Aug. 21, 2001

(54) PORTABLE REEL APPARATUS AND METHOD

(76) Inventor: Donald J. Laughlin, Jr., 1500 7$^{th}$ St., #3G, Sacramento, CA (US) 95814

( * ) Notice: Subject to any disclaimer, the term of this patent is extended or adjusted under 35 U.S.C. 154(b) by 0 days.

(21) Appl. No.: 09/457,489

(22) Filed: Dec. 8, 1999

(51) Int. Cl.$^7$ ................................................. H02G 11/02
(52) U.S. Cl. .................... 191/12.2 R; 191/12.4; 191/12.2 A; 367/191
(58) Field of Search ............... 191/12.2 R, 12.4, 191/12.2 A; 242/106, 86.5, 84.8, 99, 96; 324/65 CR; 367/191, 106

(56) References Cited

U.S. PATENT DOCUMENTS

| | | | |
|---|---|---|---|
| 2,180,354 | * 11/1939 | Frazier | 73/122 |
| 2,498,609 | * 2/1950 | Reil | 191/12.2 |
| 2,780,196 | 2/1957 | Jareckie | 114/0.5 |
| 2,972,667 | * 2/1961 | Ryder | 242/106 |
| 3,291,095 | 12/1966 | Nickerson | 114/235 |
| 3,430,179 | * 2/1969 | Shoji | 339/5 |
| 3,494,443 | 2/1970 | Huffhines | 181/0.5 |
| 3,719,331 | 3/1973 | Harsch | 242/106 |
| 4,050,180 | * 9/1977 | King | 43/27.4 |
| 4,128,960 | * 12/1978 | Marek | 43/27.4 |
| 4,204,354 | * 5/1980 | Kane | 43/4.5 |
| 4,239,249 | * 12/1980 | Sprague | 280/47.2 |
| 4,284,180 | 8/1981 | Masters | 191/12.2 |
| 4,318,461 | 3/1982 | Brorein | 191/12.2 |
| 4,581,497 | 4/1986 | Morrison | 191/12.2 |
| 4,754,442 | * 6/1988 | Baker et al. | 367/191 |
| 5,653,293 | * 8/1997 | Ellis | 172/438 |

* cited by examiner

*Primary Examiner*—S. Joseph Morano
*Assistant Examiner*—Frantz F. Jules
(74) *Attorney, Agent, or Firm*—Sierra Patent Group, Ltd.

(57) ABSTRACT

A portable reel apparatus for use with towed sonar towfish and similar apparatus. The reel apparatus of the invention can be used on small watercraft without requiring mounting to the deck, and can be quickly and easily moved and stored on-board or removed from the watercraft. The portable reel assembly comprises a frame assembly, a spool rotatably mounted within the frame assembly, an extensible boom, and an electronic interfacing assembly for maintaining communication between a sonar cable through the spool to a computer. The apparatus can be moved or repositioned between a first, deploying position and a second, storage position. The frame assembly is preferably wheeled for transporting the apparatus, and a motor for driving the spool is preferably included within the frame assembly.

4 Claims, 6 Drawing Sheets

PORTABLE REEL APPARATUS AND METHOD

BACKGROUND OF THE INVENTION

1. Field of the Invention

This invention pertains generally to reel systems and methods for extending and retracting cables and items towed on cables. More particularly, the invention is a portable reel apparatus and method for shipboard use with towed sonar devices and the like.

2. Description of the Background Art

Towed sonar devices and transducer arrays are widely used in marine applications for locating underwater objects. Typically, a derrick and winch assembly are mounted on the rear of a ship or boat and are used to deploy, tow and retrieve towed sonar devices. Such conventional assemblies generally require permanent commitment of deck space and cannot be easily placed, removed or repositioned.

Advances in transducer technology have allowed reduction in cost and size of towed sonar devices. As a result, many small private watercraft now utilize sonar "towfish" for part-time salvage operations. Small watercraft generally do not have sufficient deck space for a conventional, permanently-mounted winch and boom assembly for towfish deployment. As a result, small sonar towfish are often handled manually, with an operator physically deploying the towfish and hauling in the sonar cable and lifting the towfish out of the water. The manual deployment of sonar towfish in this manner is both fatiguing and time consuming.

There is accordingly a need for a portable reel apparatus and method suitable for use on small watercraft, which does not need to be fixedly mounted to the deck, and which can be quickly and easily moved and stored. The present invention satisfies these needs, as well as others, and generally overcomes the deficiencies found in the background art.

SUMMARY OF THE INVENTION

The invention is a portable reel apparatus and method for use with towed sonar towfish and the like. The reel apparatus of the invention can be used on small watercraft without requiring permanent mounting to the deck, and can be quickly and easily moved and stored on-board or removed from the watercraft. In general terms, the invention comprises a frame assembly, a spool rotatably mounted within the frame assembly, an extensible boom, means for electronically interfacing a sonar cable through the spool to a computer, and means for moving or repositioning the frame assembly between a first, deploying position and a second, storage position. Preferably, the frame assembly includes wheels for transporting the frame assembly. A motor for driving the spool is preferably included within the frame assembly.

By way of example, and not of limitation, the frame assembly preferably comprises a base, a top, and front and back ends. The spool includes a hub and sidewalls, and is rotatably mounted in the frame assembly between the front and back ends. The spool is structured and configured to wind and unwind a length of sonar cable coiled thereabout.

The extensible boom preferably is coupled to the top of the frame assembly, and a pulley is pivotally mounted on the end of the boom to accommodate the sonar cable. A cable guide or alignment assembly is provided on the front of the frame assembly to facilitate the re-winding or coiling of sonar cable about the spool when sonar cable is reeled in with the apparatus.

The wheels are preferably mounted on the base of the frame assembly adjacent the back end thereof to provide a "dolly"-like motility to the frame assembly. The deploying extensible lever is preferably a T-bar handle positioned adjacent back end and base of the frame assembly to facilitate the positioning of the apparatus. A padded towfish rack or cradle may be included on the frame assembly. The drive motor is preferably included within the frame assembly and is mechanically interfaced with the spool by a belt and pulley or pulleys. Preferably, a manually actuated belt tensioner mechanism is provided in association with the belt and is positioned to control tension of the belt. Means for releasibly coupling the frame assembly to the deck of a watercraft are also preferably included adjacent the bottom of the frame assembly.

The electronic interfacing means preferably comprises a slip ring electronic coupling assembly associated with the hub of the spool. In the slip ring assembly, the plurality of electrical conductors at the end of the sonar cable are maintained in electrical contact with corresponding plurality of rotating, conductive rings. A port for a computer cable is provided with the slip ring assembly, and includes a set of spring conductors which are also maintained in electrical contact with the rotating conductive rings. When a computer interface cable is engaged in the interface port, the conductors in the sonar cable are operatively coupled to the corresponding conductors in the computer interface cable via their respective conductive rings. The slip ring coupling assembly may comprise four conductive rings and corresponding spring conductors for a standard towfish cable having four separate conductors. Alternatively, the slip ring coupling assembly may utilize six conductor rings and corresponding spring conductors for dual frequency towfish applications wherein six conductors are present in the sonar cable.

When not in use, the portable reel apparatus of the invention is generally maintained in a storage position wherein the frame assembly is positioned with the back adjacent to the ground or deck, and with the boom vertically oriented an in a retracted position. In operation, a user will use the T-bar lever to move the apparatus to a desired location, typically the stern of a watercraft. The apparatus is then pivoted or moved to the deploying position wherein the base of the frame assembly is adjacent the ground or deck, and the frame is releasibly coupled to the deck. The apparatus is pivotally moved to the stowed position and the towfish is attached to the sonar cable. The apparatus is then moved to the deploying position. The boom is extended, and the sonar towfish is removed from its cradle and allowed to depend from the sonar cable at the end of the boom. The opposite end of the sonar cable is coupled, through the electronic coupler assembly at the spool hub, to a computer interface cable. The spool is then disengaged from the drive motor so that the spool can "freewheel" to quickly unwind the sonar cable, and the sonar towfish is positioned to carry out sounding operations.

After sounding operations are completed, the drive motor rotates the spool to wind up or reel in the sonar cable. The towfish placed back into the cradle and the sonar cable is detached therefrom. The boom is retracted and the apparatus is released from the deck and returned to its storage location. In this manner, the apparatus of the invention is not permanently and inconveniently mounted on the deck of the watercraft when not in use, as occurs with prior art derrick devices.

An object of the invention is to provide a portable reel apparatus and method suitable for use on small watercraft.

Another object of the invention is to provide a portable reel apparatus and method which does not require permanent mounting to the deck of a water craft.

Another object of the invention is to provide a portable reel apparatus which is portable and can be quickly and easily moved and stored.

Another object of the invention is to provide a portable reel apparatus which is wheeled to provide "dolly"-like movability.

Another object of the invention is to provide a portable reel apparatus which allows disengagement of the cable spool from the drive motor so that a towfish can be quickly "free-wheeled" into the water.

Another object of the invention is to provide a portable reel apparatus and method which allows electronic coupling of a computer interface cable to a sonar cable through a rotating spool hub.

Another object of the invention is to provide a portable reel apparatus which includes a towfish holder or cradle.

Another object of the invention is to provide a portable reel apparatus which can be releasibly coupled to the deck of a water craft.

Another object of the invention is to provide a portable reel apparatus and method which allows quick and easy control of reeling and unreeling cable through use of a hand-actuated belt tensioner.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Referring more specifically to the drawings, for illustrative purposes the present invention is embodied in the apparatus shown generally in FIG. 1 through FIG. 17. It will be appreciated that the apparatus may vary as to configuration and as to details of the parts, and that the method of the invention may vary as to details and the order of the steps, without departing from the basic concepts as disclosed herein. The invention is disclosed generally in terms of use with a sonar towfish. However, it will be readily apparent to those skilled in the art that the invention may be used in numerous applications, including the deployment of tethers, power cables or communication interface cables, the towing of objects from watercraft, aircraft or land vehicles, and other uses.

Figures 1, 2:
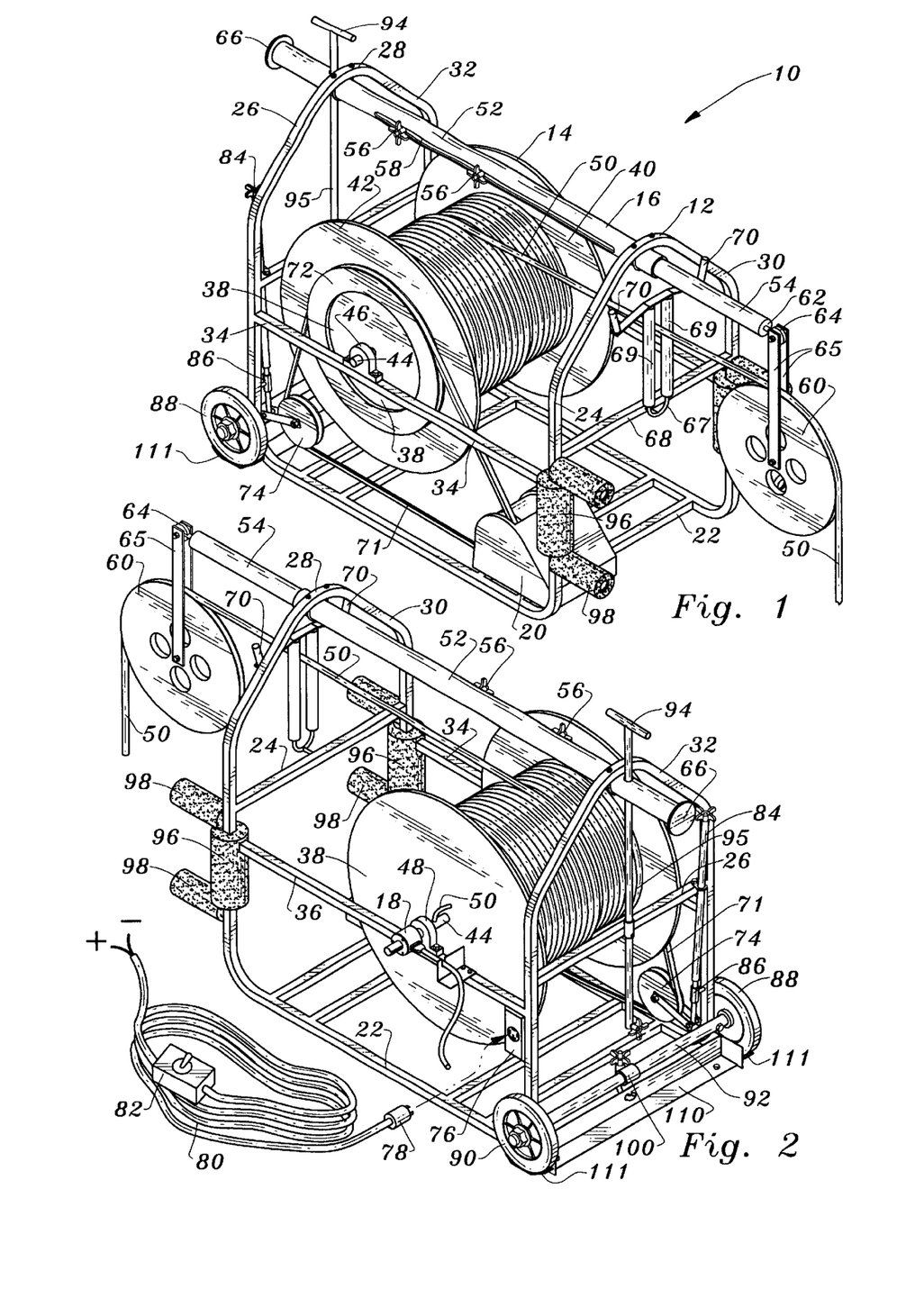
FIG. 1 is a top front perspective view of a portable reel apparatus in accordance with the present invention, shown in a deployed position.
FIG. 2 is a back front perspective view of the portable reel apparatus of FIG. 1.
Figures 3, 4, 5:
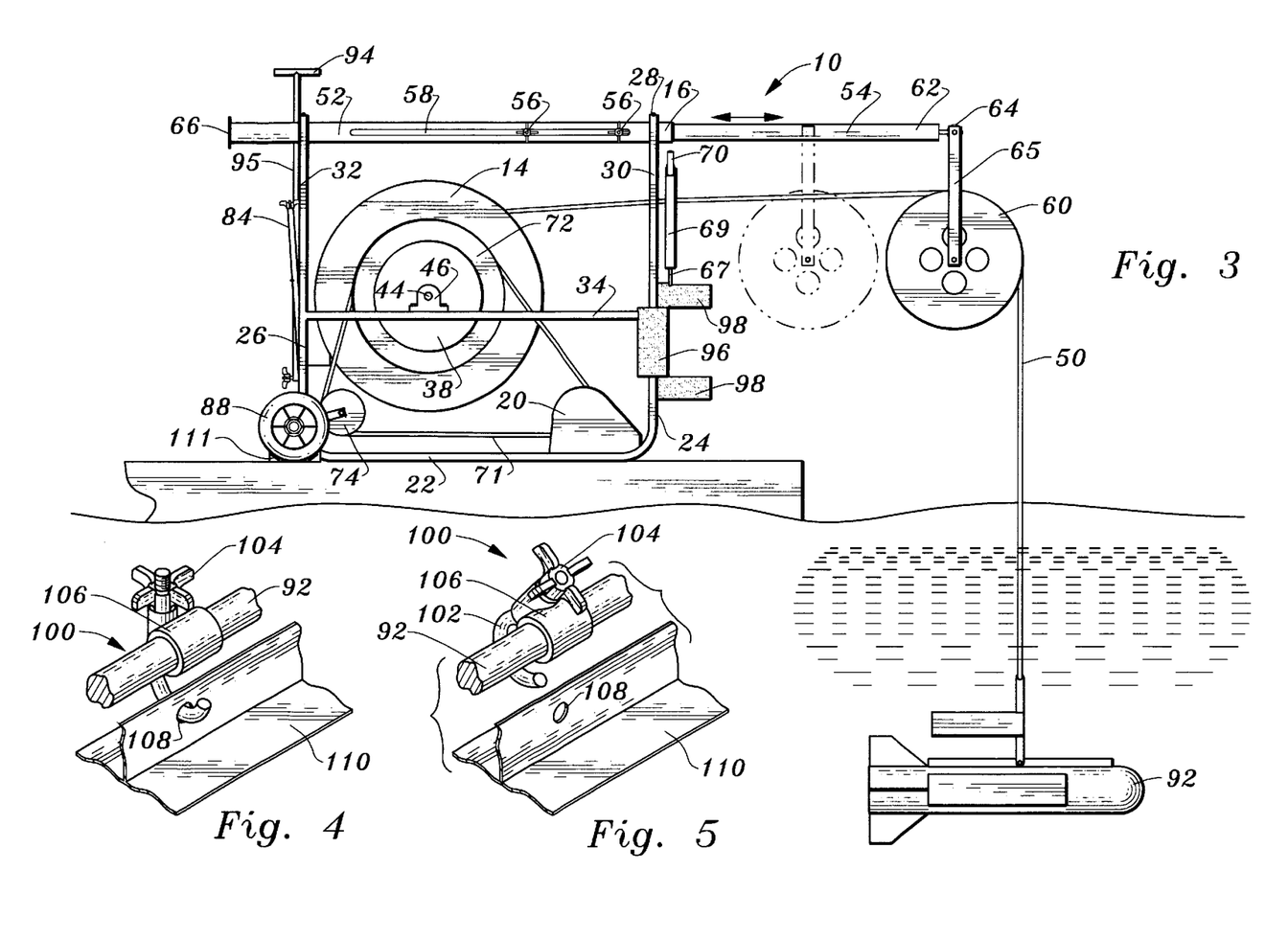
FIG. 3 is a side elevation view of the portable reel apparatus of FIG. 1 shown with a deployed sonar towfish.
FIG. 4 is a perspective view of a deck coupler in accordance with the invention shown in a fastened position.
FIG. 5 is a perspective view of a the deck coupler of FIG. 4 shown in a released position.

Referring now to FIG. 1 through FIG. 3, as well as FIG. 6, FIG. 7, FIG. 12 and FIG. 13, a portable reel apparatus 10 in accordance with the invention is generally shown. The apparatus 10 comprises a frame assembly 12, and a cable spool 14 rotatably mounted within frame assembly 12. An extensible/retractable boom 16 is included on frame assembly 12, and an electronic coupler assembly 18 is included on spool 14. A drive motor 20 is also included within frame 12, and is mechanically interfaced with spool as described further below.

Frame or frame assembly 12 preferably comprises a base 22, a front end 24, a back end 26, and a top 28. The frame 12 as shown is exemplary, and illustrates a presently preferred embodiment of frame 12. The structure and configuration of frame 12 may vary as required according to the particular uses of the invention. Preferably, frame 12 includes a front brace 30 which defines front end 24 and a back brace 32 which defines back end 26, with the upper portions of braces 30, 32 defining generally the top 28 of frame 12. Front and back braces 30, 32 are coupled to side brackets 34, 36. Frame 12 defines generally a cage-like arrangement which is structured and configured to enclose spool 14, boom 16 (when retracted) and drive motor 20, to provide portability and motility to the apparatus 10, as described further below.

The spool 14 preferably includes a hub 38 and side walls 40, 42. Spool 14 is rotatably associated with frame 12, and is preferably rotatably mounted between side brackets 34, 36 on an axle 44. Axle 44 is coupled to hub 38 and engages journal sockets or gudgeons 46, 48 on side brackets 34, 36 respectively. Spool 14 is structured and configured to accommodate a coiled sonar cable 50 about hub 38 and between side walls 40, 42, such that cable 50 can be wound and unwound from spool 14 in a conventional manner.

The extensible boom 16 is preferably mounted on the top 28 of frame 12. Extensible boom 16 includes a first, elongated, tube-like outer section 52 and a second, elongated inner section 54 which slidably fits within outer section 52 such that inner section 54 can slidably extend and retract in a telescopic fashion with respect to outer section. Outer section 52 is preferably coupled to front and back braces 30, 32 via bolts or like fasteners. Inner section 54 includes a pair of hand actuated screw tensioners 56 which extend through a longitudinal slot 58 in outer section 52, to allow inner section 54 to be locked into place at a selected position with respect to outer section 52.

A cable pulley 60 is mounted on the deploying end 62 of inner section 54 of boom 16. Preferably, a hinge assembly 64 is included on boom end 62, and is coupled to pulley 60 via a pair of supports 65, with pulley 60 rotatably mounted between supports 65. Hinge assembly 64 allows pulley 60 to pivot in both lateral and longitudinal directions to facilitate the deployment and retrieval of sonar cable. A base end 66 is included on outer section 52 of boom 16 adjacent back end 26 of frame 12. Base end 66 provides support for the apparatus 10 when the apparatus is positioned for storage.

Figure 6:
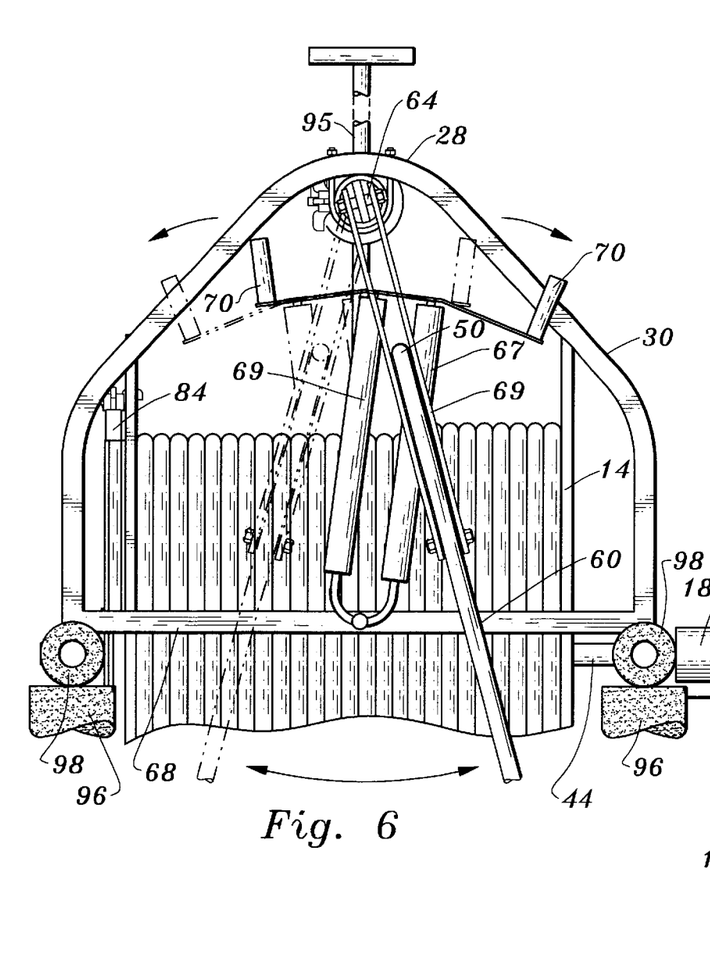
FIG. 6 is a front elevation view of a portion of the portable reel apparatus of FIG. 1 showing the movement of the sonar cable guide and pulley on the extensible boom.

A cable guide assembly 67 is preferably included with the invention and is pivotally mounted on a front brace 68 at the front end 24 of frame 12. Guide assembly 67 is located between spool 14 and pulley 60, and cable 50 passes between a pair of roller guides 69 on the guide assembly 67. Handles 70 on guide assembly 67 allow a user to manually position guide assembly 67 as sonar cable 50 is wound onto spool 14. Guide assembly 67 facilitates the re-winding of cable 50 onto spool 14 by optimally positioning the cable 50 onto spool 14.

Drive motor 20 is preferably an electrically powered motor or like drive means. Drive motor 20 is mounted on frame 12, preferably on base 22 and positioned generally within the cage-like structure defined by frame 12. Drive motor 20 is mechanically interfaced with spool 14 via a drive belt 71 associated with drive motor 20. A first pulley 72 is included on hub 38 of spool 14, and a second pulley 74 is mounted to frame 12 adjacent base 22 and back end 26. Drive belt 71 partially encircles pulleys 72, 74 and provides rotational power to spool 14. A power receptacle 76 (FIG. 2) accommodates plug 78 of power cord 80. A toggle switch control box 82 allows manual activation of drive motor 20 for winding and unwinding cable 50 from spool 14. A manual belt tensioner lever 84 and belt tensioner assembly 86 are preferably included with the invention and are described in detail below. Drive motor 20 may alternatively be located externally with respect to the apparatus 10, and not associated with frame 12, with a suitable belt and pulley arrangement (not shown) used to mechanically interface drive motor 20 with spool 14.

The apparatus 10 preferably includes wheels 88, 90, which are rotatably mounted on an axle 92 associated with the base 22 of frame 12 adjacent the back end 26 thereof. An extensible/retractable handle or "T-bar" 94 and lever 95 are associated with the back end 26 of frame 12, to allow a user to reposition the apparatus 10. A towfish cradle 96 may be included on frame 12 to accommodate towfish 97 when not in use. Cradle 96 includes padded supports 98 to hold a towfish in place as described further below. The structure and configuration of frame 12, together with wheels 88, 90, handle 94 and lever 95, provide means for moving or repositioning the apparatus 10 between a first, deploying position and a second, storage position.

The invention preferably includes, means for coupling the apparatus 10 to a deck or surface, which is provided by a deck coupling assembly 100. Referring also to FIG. 4 and FIG. 5, deck coupling assembly comprises a movable hook 102 and hand-actuated tensioner 104 mounted on axle 92 by sleeve 106. Hook 102 is structured and configured to releasibly engage a hole 108 in a deck plate 110. Deck plate 110 is fixedly coupled to the deck of a ship or other surface. When hook 102 is engaged in hole 108 in deck plate and secured via tensioner 104, the apparatus 10 is secured in place. Deck plate 110 preferably includes wheel cradles 111 to accommodate wheels 88, 90.

Figure 7:
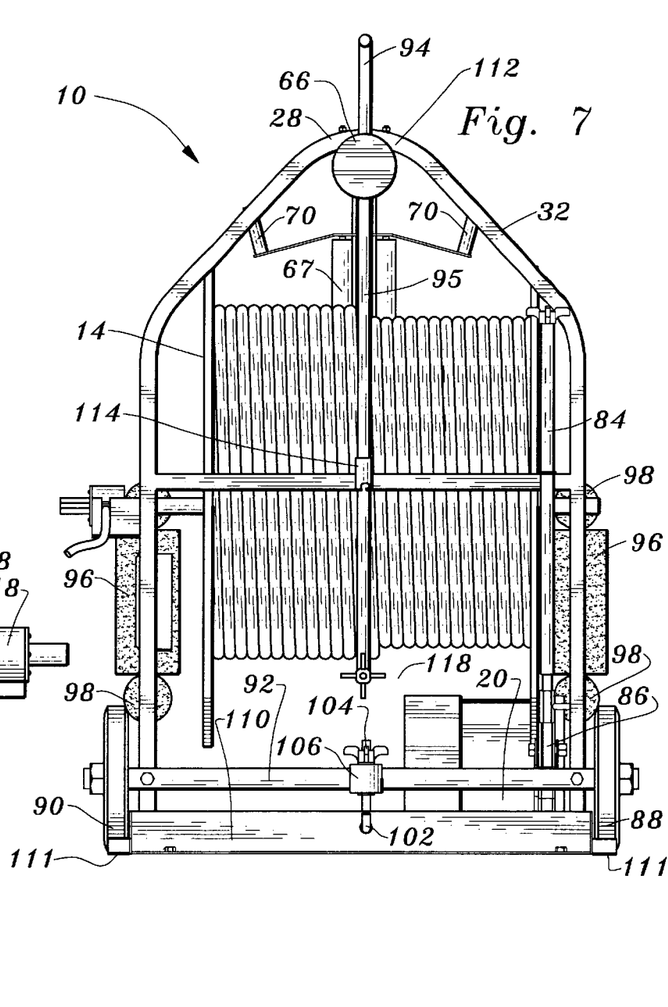
FIG. 7 is a back elevation view of the portable reel apparatus of FIG. 1.
Figures 8, 9:
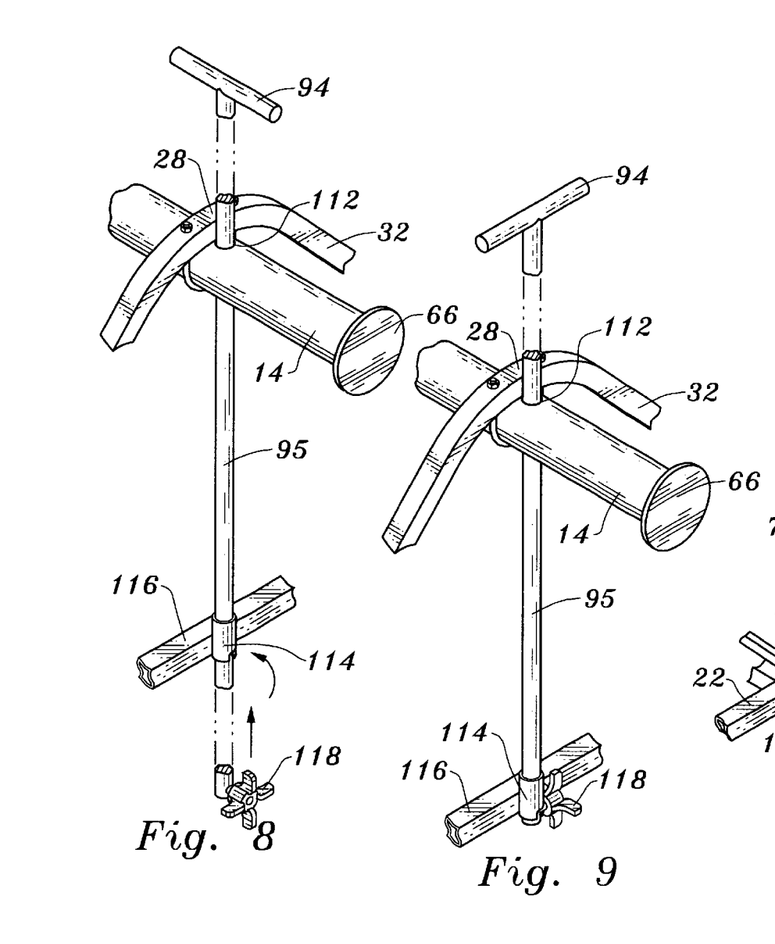
FIG. 8 is a perspective view of an extensible lever in accordance with the invention shown in a retracted position.
FIG. 9 is a perspective view of the extensible lever of FIG. 8 shown in an extended position.

Referring now to FIG. 8 and FIG. 9, as well as FIG. 7, the operation of extensible T-bar handle 94 and lever 95 will be more fully understood. Lever 95 extends through a bore or opening 112 in boom 14, and by a slotted sleeve 114 coupled to bracket 116 at the back 26 of frame 12. A hand actuated screw tensioner 118 is included on the lower end of lever 95. FIG. 7 and FIG. 8 show lever 95 and handle 94 in a retracted position, with handle 94 positioned to be generally parallel to boom 14, and with tensioner 118 positioned generally below brace 116 and slotted sleeve 114. FIG. 9 shows lever 95 and handle 94 in an extended or deployed position, with handle 94 positioned generally perpendicular to boom 14, and with the tensioner 118 positioned generally adjacent brace 116 and slotted sleeve. Lever 95 and handle 95 can be secured in the extended position by tightening tensioner 118 against slotted sleeve 114. The positioning of lever 95 through boom 14 helps to secure boom 14 in place.

Figures 10, 11:
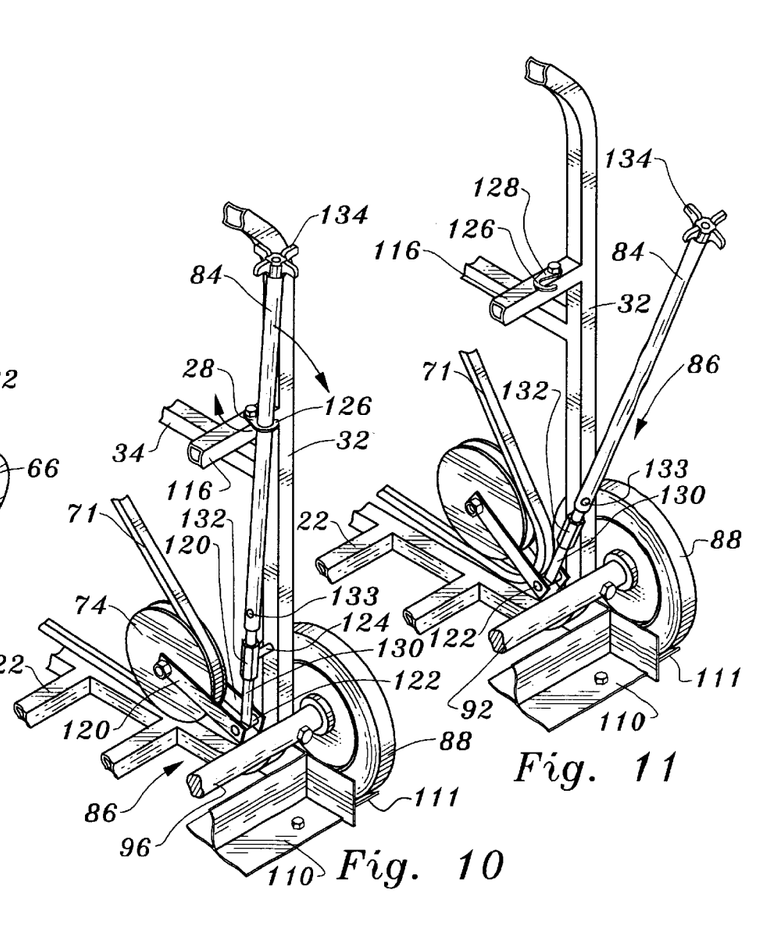
FIG. 10 is a perspective view of a belt tensioning lever in accordance is with the invention shown in an engaged or tensioning position.
FIG. 11 is a perspective view of the belt tensioning lever of FIG. 10 shown in a disengaged or non-tensioning position.

Referring next to FIG. 10 and FIG. 11, as well as FIG. 7, the operation of belt tensioning lever 84 and belt tensioning assembly 86 will be more fully understood. Assembly 86 includes a pair of support members 120 which rotatably support pulley 74 therebetween. Members 120 are pivotally coupled to tensioner lever 84 by hinge assembly 122. Lever 84 is also pivotally coupled to back bracket 32 via pintle 124. FIG. 10 shows brake lever 84 and tensioner assembly 86 in an engaged position wherein drive belt 71 is tensionally engaged with pulley 74. FIG. 11 shows belt tensioner lever 84 and assembly 86 in a disengaged position wherein pulley 74 is disengaged from drive belt 71. A hook 126 is pivotally mounted on brace 116 via pin 128, and tensioner lever 84 may be held in the non-engaged position by hook 126, as can be seen most clearly in FIG. 10.

When in the engaged position shown in FIG. 10, pulley 74 tensions drive belt 71 such that rotational energy is transferred from drive belt 71 to pulley 72 and hence to spool 14 for winding (and unwinding) cable 50 therefrom. When in the unengaged position shown in FIG. 11, pulley 74 is disengaged from drive belt 71 such that drive belt 71 does not tensionally engage spool 14. When belt tensioner lever 84 is in the disengaged position, spool 14 can "free-wheel" or rotated independently of the speed of drive motor 20 to allow rapid deployment of towfish 97.

Belt tensioning lever 84 is coupled to bolt 130, which extends into the lower end of tensioning lever 84. Lever 84 also preferably includes an internally threaded nut 132 which is pivotally coupled to brace 32 via pintle 124, with threaded bolt 130 extending through nut 132. A set screw secures bolt 130 to lever 84. A handle 134 is coupled to the top end of lever 84, and the bottom end of lever 84 is coupled to hinge assembly 122. By turning handle 134, lever 84 and bolt 130 rotate with respect to nut 120 such that the distance between pivotally fixed nut 132 and hinge assembly 122 is increased or decreased. The changing of the distance between nut 130 and hinge assembly 122 in this manner serves to incrementally increase or decrease the tension applied to belt 71.

Referring now to FIG. 14 through FIG. 17, the slip ring electronic coupling assembly 18 of the invention is illustrated in detail. Electronic coupling assembly 18 includes a sleeve 136 of insulating material, with a plurality of circular conducting tracks, grooves or rings 138 thereon. Sleeve 136 fits over and is coupled to the end of axle 44 and is coupled thereto via bolt 137. Sleeve 136 is held in place on axle 44 by screw 127. A waterproof housing 146 encloses sleeve 136 and conductor rings 138, and an annular cover 148 fits over the end of axle 44 and couples to housing 146 via bolts 150. Housing 146 is held in place on axle 44 by keeper 142 and screw 144. Housing 146 includes a jack or socket 152 for a computer interface cable connector 154. A plurality of spring conductors 156 are included within socket 152, with each spring conductor 156 in electrical contact with a corresponding conducting ring or groove 138 on sleeve 136. Housing 146 is fixedly coupled to brace 34 or gudgeon 46 by conventional hardware (not shown). Bearings (not shown) are preferably included with gudgeon 46 and cover 148 to minimize friction associated with rotation of axle 44.

Figures 14, 15, 16, 17:
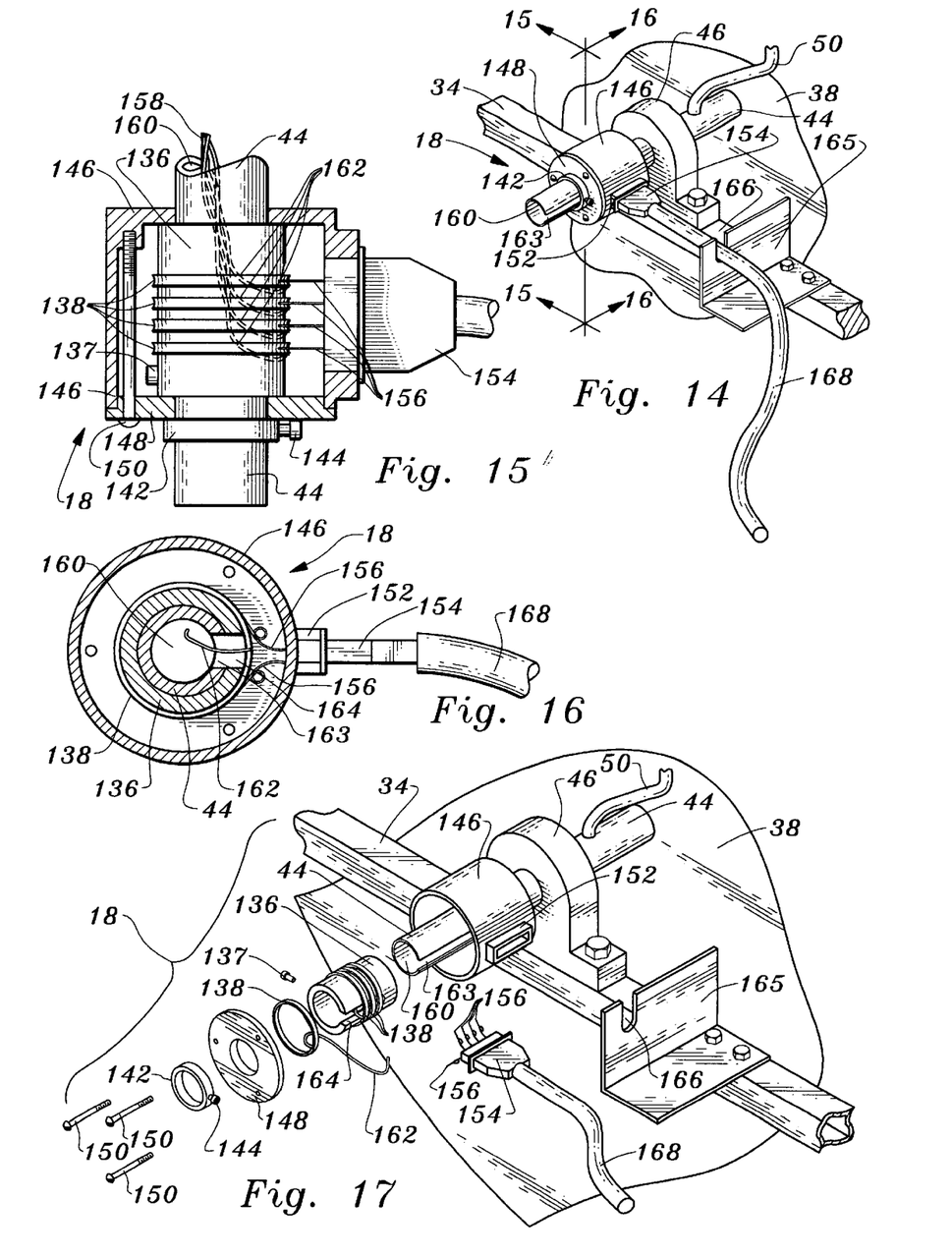
FIG. 14 is a perspective view of an electronic hub coupling assembly in accordance with the present invention.
FIG. 15 is a cross-sectional view of the electronic hub coupling assembly of FIG. 14 shown through line 15—15.
FIG. 16 is a cross-sectional view of the electronic hub coupling assembly of FIG. 14 shown through line 16—16.
FIG. 17 is an exploded view in perspective of the electronic hub coupling assembly of FIG. 14.

Sonar cable 50 on spool 14 extends through hub 38 and sidewall 40 and into axle 44, with the end 158 (FIG. 15) of sonar located within the hollow interior 160 of axle 44. Cable end 158 is shown without an outer conductor sheath for reasons of clarity. A plurality of cable conductors 162 are associated with cable end 158, and each cable conductor 162 is positioned in electrical contact with a corresponding conductor ring 138 on sleeve 136. A slot 163 at the end of axle 44 and slot 164 in sleeve 136 allows cable conductors 162 to access conductor rings 138. As spool 14 and axle 44 rotate, the attached sleeve 136 and conductor rings 138, as well as cable end 158 and conductors 162, correspondingly rotate. Spring conductors 156, together with socket 152 and housing 146 remain stationary while sleeve 136 and conductor rings 138 rotate, with spring conductors 162 remaining in electrical contact with conductor rings 138 during rotation. Thus, sonar cable 50 and towfish 97 remain in communication interface with an external computer (not shown) via the rotating conductive rings 138 on sleeve 136 as stationary spring conductors 162 remain in electrical contact with the rotating rings 138. A support plate 165 is preferably coupled to brace 134, with a notch 166 provided in plate 165 to support a computer interface cable 168 associated with connector 154. Spring conductors 156 are generally associated with interface jack 152 in housing 146, but may alternatively be associated with computer interface connector 154 as shown in FIG. 17.

As noted above, the use of four ring conductors 138 and spring conductor sets 156 is only exemplary, and a larger number of slip wrings 138 and conductors 156 may be used.

Figure 12:
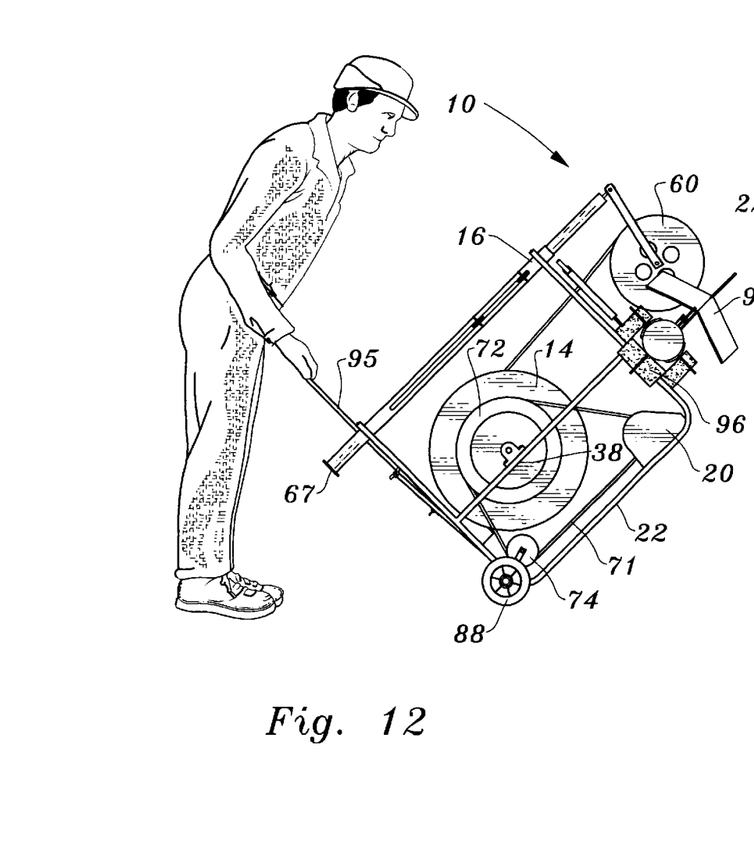
FIG. 12 is a side elevation view of a portable reel apparatus in accordance with the invention shown with a stored sonar towfish and shown being transported by a user.
Figure 13:
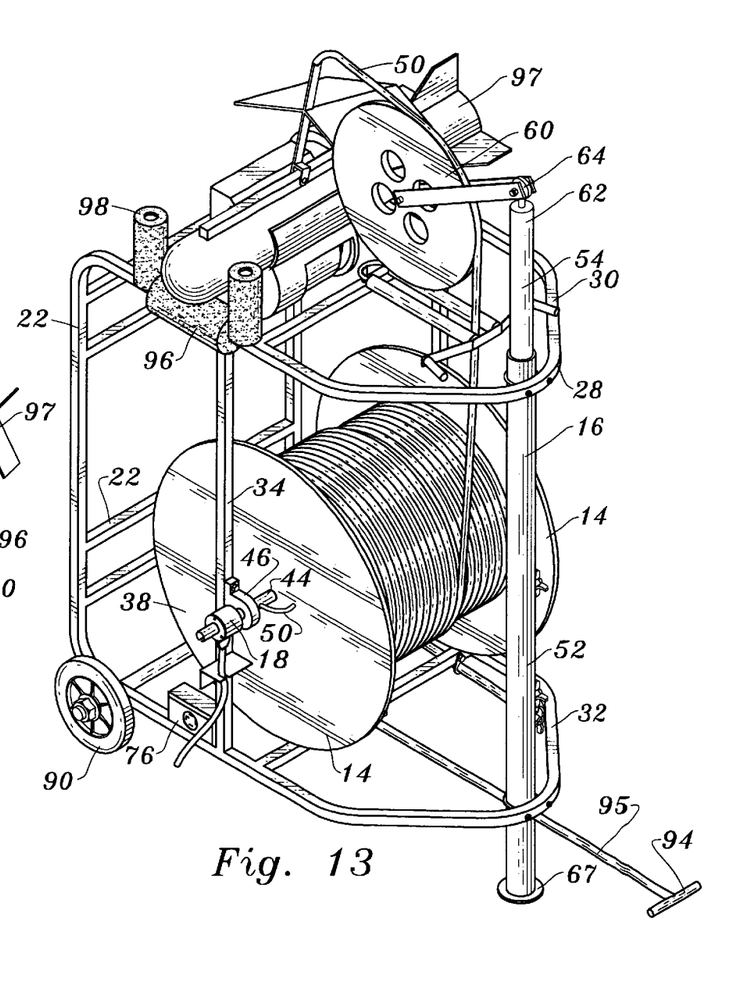
FIG. 13 is a top front perspective view of the portable reel apparatus of FIG. 12 shown in a storage position.

The portable reel apparatus 10 of the invention is generally movable between a first, deploying position, shown generally in FIG. 1 through FIG. 3, and a second, storage position shown generally in FIG. 13. The apparatus 10 is transportable by positioning frame 12 such that wheels 88, 90 are adjacent the deck or ground surface, as shown in FIG. 12. When in the storage position, the back 26 of frame 12 will be facing downward and be positioned adjacent the ground or deck, with the apparatus 10 resting generally on wheels 88, 90 and base end 67 of boom 14, as shown in FIG. 13. In the storage position, front 24 of frame 12 faces upward so that cradle 96 is positioned to hold sonar towfish 97 during storage. In the deployed position, base 22 of frame 12 is adjacent the deck.

In operation, a user will grasp T-bar handle 94 on lever 95 and tilt the apparatus 10 as shown in FIG. 12, and roll the apparatus 10 on wheels 88, 90 to the location where the apparatus will be deployed. As noted above, the apparatus 10 will typically be used at the stern of a small watercraft for deploying and recovering sonar towfish 97. When the apparatus 10 has been moved to a desired location, the user tilts the apparatus 10 into the deploying position shown in FIG. 1 through FIG. 3. T-bar handle 94 may be retracted by loosening tensioner 118 (FIG. 8, FIG. 9) and sliding lever 95 downward through sleeves 112, 114). Axle 92 is positioned adjacent deck plate 110, and the apparatus is secured to deck plate 110 by engaging hook 112 of deck coupling assembly 100 (FIG. 4, FIG. 5) to hole 108 in deck plate 110, with wheels 88, 90 positioned in wheel cradles 111. The apparatus is then moved to the stowed position shown in FIG. 13 while wheels 88, 90 are in cradles 111 and coupling assembly 100 is attached to deck plate 110. The end of sonar cable 50 is passed through roller guides 69, between pulley supports 65, around pulley 60, and is fastened to towfish 97 while tow fish is positioned within cradle 96. The apparatus 10 is then moved to the deploying position again, and inner section 54 of boom 14 is slidably extended from outer section 52, and is secured in an extended position by tightening fasteners 56 in slot 58. Plug 78 on power cable 80 is engaged in receptacle 76 to provide power to drive motor 20. The user then releases belt tensioner lever 84 to remove tension from belt 71 so that spool 14 can rotate freely, and towfish 97 is "free-wheeled" into the water. Once towfish 97 has reached a desired position and/or depth, belt tensioner 84 is positioned to re-engage belt 71 to stop rotation of spool 14. Alternatively, the user may activate drive motor 20 via toggle control 82 to rotate spool 14 by drive motor 20 and unwind cable 50 to more slowly lower towfish 97 into the water behind the watercraft. Drive motor 20 is turned off via toggle control 82 when not in use.

Once sonar sounding operations are completed, the user activates toggle control 82 to rotate spool 14, via drive motor 20, to re-wind cable 50 about spool 14 and retrieve towfish 92. As the cable 50 winds onto spool 14, the user manually moves cable guide assembly 67 (FIG. 6) back and forth in an oscillating manner so that cable 50 is correctly positioned on spool 14. Once towfish 97 has been retrieved, towfish 97 is secured in cradle 96, tensioners 56 are loosened, inner section 54 of boom is retracted into outer section 52, and tensioners are tightened to hold boom 14 in a retracted position. The hook 102 of deck coupling assembly 100 is released from deck plate 100. T-bar handle 94 is extended, and the apparatus 10 is tilted and wheeled to its storage location, and is placed in the storage position until it is needed again.

The invention thus allows deployment of a sonar towfish from a watercraft without requiring a permanent derrick or winch assembly mounted in the stern of the water craft. The portable nature of the apparatus 10 provided by wheels 88, 90 and handle allow movement and storage of the apparatus in a desired onboard location, or easy removal of the apparatus 10 from a watercraft for storage onshore. The structure and configuration of frame assembly 12 provides a storage position for the apparatus 10 which occupies substantially less deck space than is required during deployment of the apparatus 10, which makes the invention particularly advantageous for use on small watercraft which have limited deck space. The electronic coupling assembly 18 provides for continuous communication between sonar towfish 97 and an onboard computer during rotation of spool 14.

Accordingly, it will be seen that this invention provides a portable reel apparatus usable on small watercraft without requiring mounting to the deck, and which can be quickly and easily be moved and stored on-board or removed from the watercraft. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A reel apparatus, comprising:
   (a) a frame assembly;
   (b) a spool, said spool rotatably mounted in said frame assembly;
   (c) an extensible boom, said extensible boom coupled to said frame assembly;
   (d) means, associated with said frame assembly, for moving said frame assembly between a first, deploying position and a second, storage position; and
   (e) said means for moving said frame assembly comprises a handle.

2. A sonar reel apparatus, comprising:
   (a) a frame, said frame including a base, said frame including front and back ends;
   (b) a spool, said spool rotatably mounted in said frame assembly;
   (c) an extensible boom, said extensible boom coupled to said frame assembly;
   (d) said frame including at least one wheel, said one wheel located proximate to said base and said back end of said frame;
   (e) said frame assembly movable between a first, deploying position and a second, storage position; and
   (f) a handle associated with said frame.

3. A sonar reel apparatus, comprising:
   (a) a frame, said frame including a base, said frame including front and back ends;
   (b) a spool, said spool rotatably mounted in said frame assembly;
   (c) an extensible boom, said extensible boom coupled to said frame assembly, said extensible boom positioned to extend outward from said front end of said frame, said extensible boom including a pulley on an outer end thereof;
   (d) said frame including at least one wheel, said one wheel positioned adjacent said base of said frame, said wheel positioned adjacent said back end of said frame;
   (e) an electronic coupling assembly, associated with a hub of said spool, said electronic coupling assembly structured and configured to interface a sonar cable with a computer;
   (f) said frame assembly movable between a first, deploying position and a second, storage position;
   (g) a drive motor assembly, said drive motor assembly mechanically interfaced with said spool by a drive belt; and
   (h) a belt tensioner lever, said belt tensioner lever positioned to tension said drive belt when in a tensioning position.

4. A sonar reel apparatus, comprising:
   (a) a frame, said frame including a base, said frame including front and back ends;
   (b) a spool, said spool rotatable mounted in said frame assembly;
   (c) an extensible boom, said extensible boom coupled to said frame assembly, said extensible boom positioned to extend outward from said front end of said frame, said extensible boom including a pulley on an outer end thereof;
   (d) said frame including at least one wheel, said one wheel positioned adjacent said base of said frame, said wheel positioned adjacent said back end of said frame;
   (e) an electronic coupling assembly, associated with a hub of said spool, said electronic coupling assembly structured and configured to interface a sonar cable with a computer;
   (f) said frame assembly movable between a first, deploying position and a second, storage position;
   (g) a handle, said handle associated with said frame proximate to said base and said back end; and
   (h) a deck coupling assembly, said deck coupling assembly associated with said frame proximate to said base and said back end.

* * * * *